United States Patent
Alù et al.

(10) Patent No.: US 12,204,071 B2
(45) Date of Patent: Jan. 21, 2025

(54) METASURFACE SPECTRO-POLARIMETER

(71) Applicants: Research Foundation of the City University of New York, New York, NY (US); Nanohmics Inc., Austin, TX (US)

(72) Inventors: Andrea Alù, Tenafly, NJ (US); Adam C. Overvig, Bronx, NY (US); Shuwei Guo, New York, NY (US); You Zhou, Jersey City, NJ (US); Mark Lucente, Austin, TX (US)

(73) Assignees: Research Foundation of the City University of New York, New York, NY (US); Nanohmics, Inc., Austin, TX (US)

( * ) Notice: Subject to any disclaimer, the term of this patent is extended or adjusted under 35 U.S.C. 154(b) by 535 days.

(21) Appl. No.: 17/586,374

(22) Filed: Jan. 27, 2022

(65) Prior Publication Data

US 2022/0236453 A1     Jul. 28, 2022

Related U.S. Application Data

(60) Provisional application No. 63/142,357, filed on Jan. 27, 2021.

(51) Int. Cl.
    *G02B 1/00*      (2006.01)
    *G02B 27/10*     (2006.01)

(52) U.S. Cl.
    CPC ......... *G02B 1/002* (2013.01); *G02B 27/1006* (2013.01)

(58) Field of Classification Search
    CPC .... G02B 1/002; G02B 27/1006; G02B 1/005; G02B 1/007
    See application file for complete search history.

(56) References Cited

U.S. PATENT DOCUMENTS 9,739,918 B2    8/2017    Arbabi et al.
11,366,296 B2    6/2022    Devlin et al.

OTHER PUBLICATIONS

Arbabi, A. et al.; Dielectric Metasurfaces for Complete Control of Phase and Polarization with Subwavelength Spatial Resolution and High Transmission; Nature Nanotechnology; Aug. 31, 2015; pp. 937-943; vol. 10.

(Continued)

*Primary Examiner* — Christopher Stanford
*Assistant Examiner* — Journey F Sumlar
(74) *Attorney, Agent, or Firm* — Peter J. Mikesell; Schmeiser, Olsen & Watts, LLP

(57) ABSTRACT

A metasurface that is designed to control electromagnetic radiation (EMR) in ways that perform more than a single function. The metasurface has a substrate layer that has multiple asymmetric nanofeatures, each having a height (H) between $\lambda_{min}/100$ and $2\lambda_{max}$. Each nanofeature has a particular length ($D_y$) that extends along a principal in-plane direction $\theta$ and a width ($D_x$) that is orthogonal thereto. Each nanofeature is tailored to scatter with different patterns one polarization state of electromagnetic radiation and one orthogonal polarization state of electromagnetic radiation.

25 Claims, 13 Drawing Sheets

(56) References Cited

OTHER PUBLICATIONS

Khorasaninejad, M. et al.; Super-Dispersive Off-Axis Meta-Lenses for Compact High Resolution Spectroscopy; Nano Lett; Apr. 27, 2016' pp. 3732-3737; vol. 16; DOI: 10.1021/acs.nanolett.6b01097.

Zhu, A. et al.; Ultra-compact visible chiral spectrometer with meta-lenses; APL Photonics 2; Feb. 7, 2017; pp. 036103-1-036103-12; https://doi.org/10.1063/1.4974259.

Vaskin, A. et al.; Light-emitting metasurfaces; Nanophotonics; Jul. 2019; pp. 1151-1198; 8(7); https://doi.org/10.1515/nanoph-2019-0110.

Dahan, N. et el.; Geometric Doppler Effect: Spin-Split Dispersion of Thermal Radiation; Physical Review Letters; Sep. 21, 2010; pp. 136402-1-136402-4; DOI: 10.1103/PhysRevLett.105.136402.

Greffet, J. et al.; Coherent emission of light by thermal sources; letters to nature; Mar. 7, 2002; pp. 61-64; vol. 416.

Overvig, A. et al.; Multifunctional Nonlocal Metasurfaces; Physical Review Letters; Jul. 2, 2020; pp. 017402-1-017402-6; DOI: 10.1103/PhysRevLett.125.017402.

Lee, J. et al.; Circularly polarized thermal radiation from layer-by-layer photonic crystal structures; Appl. Phys. Lett.; Jan. 31, 2007; pp. 051912-1-051912-3; vol. 90; DOI: 10.1063/1.2435958.

Overvig, A. et al.; Selection rules for quasibound states in the continuum; Physical Review B; Jul. 24, 2020; pp. 035434-1-035434-28; DOI: 10.1103/PhysRevB.102.035434.

Wadsworth, S. et al.; Broadband circularly-polarized infrared emission from multilayer metamaterials; Optical Materials Express; Jul. 28, 2011; pp. 466-479; vol. 1, No. 3.

Overvig, A. et al.; Chiral Quasi-Bound States in the Continuum; Physical Review Letters; Feb. 17, 2021; pp. 073001-1-073001-6; DOI: 10.1103/PhysRevLett.126.073001.

Malek, S. et al.; Multifunctional resonant wavefront-shaping meta-optics based on multilayer and multi-perturbation nonlocal metasurfaces; Light: Science & Applications; Aug. 3, 2022; 13 pages; https://doi.org/10.1038/s41377-022-00905-6.

Iyer, P. et al.; Unidirectional luminescence from InGaN/GaN quantum-well metasurfaces; Nature Photonics; Sep. 2020; pp. 543-548; vol. 14; https://doi.org/10.1038/s41566-020-0641-x.

Overvig, A. et al.; Wavefront-selective Fano resonant metasurfaces; Advanced Photonics; Mar. 18, 2021; pp. 026002-1-026002-11; vol. 3(2); DOI: 10.1117/1.AP.3.2.026002.

Zhou, M. et al.; Self-Focused Thermal Emission and Holography Realized by Mesoscopic Thermal Emitters; ACS Photonics; Jan. 15, 2021; pp. 497-504; vol. 8; https://dx.doi.org/10.1021/acsphotonics.0c0148.

Miller, D. et al.; Universal modal radiation laws for all thermal emitters; PNAS; Apr. 25, 2017; pp. 4336-4341; vol. 114, No. 17.

901

902

METASURFACE SPECTRO-POLARIMETER

CROSS-REFERENCE TO RELATED APPLICATIONS

This application claims the benefit of U.S. Provisional Patent Application No. 63/142,357 (filed Jan. 27, 2021), which is incorporated by reference herein in its entirety.

STATEMENT REGARDING FEDERALLY FUNDED RESEARCH

This invention was made with government support under grant number 80NSSC19C0591 awarded by the National Aeronautics and Space Administration. The government has certain rights in the invention.

FIELD OF THE INVENTION

This disclosure is related to spectropolarimeters and their use in separating, identifying, and imaging spectral, spatial, and polarization components of electromagnetic radiation (EMR) and in constructing spectral images, often called spectral maps.

GENERAL DESCRIPTION

Spectrometers are used for gathering electromagnetic radiation from a scene, and typically operate by separating the spectral components of the gathered radiation into individual wavelengths or narrow spectral bands (i.e. narrowest resolvable spectral pattern within a broader spectral range) and directing the spectral components to a detector, which detects and measures the spectrally separated radiation and converts the resulting spectral information to electrical signals that are representative of the spectral composition of the radiation. Mapping spectrometers, including multispectral and hyperspectral imagers, associate these spectra with a position on a spatial or angular map. Multispectral and hyperspectral detection and imaging have applications in a broad array of fields such as medicine, robotics, autonomous vehicles, environmental monitoring, planetary science, and satellite surveillance. Hyperspectral imagers and associated methods of analysis are also useful for tracking and detecting chemical or physical markers. In manufacturing or food processing, spectral imaging is employed for quality assurance purposes, for example, the verification that spectral markers in a product or component meet specific parameters.

Many currently available spectral imaging systems require numerous optical components, complex spectroscopic instrumentation, and precision alignment, and are large, heavy, and expensive.

Many hyperspectral imaging systems utilize spatial scanning, i.e., scanning thin swaths of a scene in a single spectral image frame, which uses motion such as the rastering of a mirror or movement of an airplane or satellite across a region of landscape or a planet for capturing the image swaths. An entire spectral image or scene can be assembled and processed after all the swaths have been captured.

One alternative to spatial scanning is spectral scanning, such as with etalon-based hyperspectral imagers, which are typically complex and have limited spectral band resolution or spectral grasp. Spectrometers that use for example tunable bandpass filters filter most of the incident radiation, resulting in undesirable tradeoffs including weak signals at the radiation detector, large collection optics, concomitant long integration times, and spectral maps with low signal-to-noise ratios (SNRs).

Spectrometers that use superpixel detector configurations or spectral filter arrays, including fixed filter mosaics, are known to sacrifice spatial resolution (i.e., the number of spatial samples in a spectral map) in order to enhance spectral resolution. Some spectrometers that use subpixel filter arrays can have misalignments among the spectral components due to inherent spectral filter structure, resulting in data misalignment. Some spectral imagers may require costly, irreversible integration between the focal plane array (FPA) detector array and spectral filters.

SUMMARY

This disclosure provides an apparatus for analyzing radiation using a metasurface and a detector array. The apparatus constructs a spectral map of the electromagnetic radiation in each spectral band that is incident on the metasurface for the plurality of spectral bands spanning the detector array. The disclosure provides an imaging spectropolarimeter, sometimes called a mapping spectropolarimeter. The disclosure combines a metasurface with a detector array, such as focal plane array sensor, to analyze the spectral content and polarization state of electromagnetic radiation at each point in the one-dimensional (1D) view of the scene. The resulting spectral map is a 1D image or spatial map that contains the spectral intensity of each point in the map, i.e., the spectral intensity of electromagnetic radiation (EMR) as a function of wavelength. Furthermore, the map contains a polarization characterization for each point in the map as a function of wavelength.

The polarization of EMR can be a wide range of states, including linearly polarized, right-hand circularly polarized (RCP), left-hand circularly polarized (LCP), elliptically polarized, partially polarized, and unpolarized. According to embodiments described herein, spectral patterns such as spectral intensity information, spatial information, and/or polarimetric information about the radiation whose passing to the detector array is controlled by the metasurface can be determined and the resulting information can be used in constructing a spectral map of electromagnetic radiation that is incident on the metasurface.

The disclosure provides a metasurface that is sometimes called a multifunction metasurface because it is designed to control electromagnetic radiation (EMR) in ways that perform more than a single function (e.g., focusing). The metasurface focuses EMR to three or more patterns (i.e., foci) to analyze the polarimetric information. These patterns are separated in one direction on the detector array. Each of the focused patterns is spectrally dispersed to analyze spectral intensity information into small spectral bands. The direction of the spectral dispersion is approximately orthogonal to the direction of separation of the patterns on the detector array. In some embodiments, each of the patterns is spread to map spatial information in the same direction as the direction of pattern separation on the detector array.

Embodiments described herein provide solutions to numerous problems encountered with the use of other systems for constructing spectral maps. By way of example, in other systems a spectral filter array such as a color filter array or bandpass filter array may be used to pass only radiation that is within a selected spectral band or bands of interest, such as for example red light, green light, and/or yellow light. That is, only specific and often narrow bands of radiation (red light, green light, yellow light) pass through the bandpass filter array to pixels on a detector array, the selected pixels being determined by the placement of each color filter in the filter array. Information about radiation received at a detector array can be used to construct spectral and spatial maps of, for example, a scene.

In contrast to existing systems for constructing spectral maps, embodiments described herein can be very compact, light-weight, fast, inexpensive, mechanically robust, and produce highly detailed spectropolarimetric maps. In addition, embodiments described herein enable use of a metasurface that can be reversibly integrated with any of a variety of detectors, including current commercially available detectors.

Embodiments described herein are useful in numerous applications including for example scene imaging, satellite imaging, identification of remote objects, analysis of chemical and physical markers in a variety of settings, and medical imaging. Additional applications include chemical analysis of emissions, detection of improvised explosive devices, and protection from directed-energy weapons that target personnel, missiles, vehicles, and optical devices. Some Embodiments are also useful for multispectral infrared (IR) hyperspectral imaging to provide for visualization of images through obscurants such as smoke, dust, and camouflage and can be used for nighttime automated passive detection and identification of objects over large scene areas. In some embodiments the 1D spectral map is extended into a 2D spectral map by scanning angularly or sweeping spatially such as using the scanning pushbroom imaging technique.

Throughout this application including in the claims, the symbol "~", which means "approximately", and the term "about" indicate that a value includes plus or minus 10% of the value. For example, "about 4" or "~4" means from 3.6-4.4 inclusive of the endpoints 3.6 and 4.4, and "about 1 nm" means from 0.9 nm to 1.1 nm inclusive of the endpoints 0.9 nm and 1.1 nm. As used herein, the term "equal" and its relationship to the values or characteristics that are "substantially equal" would be understood by one of skill in the art. Typically, "substantially equal" can mean that the values or characteristics referred to may not be mathematically equal but would function as described in the specification and/or claims. All size ranges described herein are inclusive of the lower and upper limit values.

The citation of any references herein is not an admission that such references are prior art for the present invention. It should be understood that the detailed description and the specific examples, while indicating specific embodiments of the invention, are given by way of illustration only, since various changes and modifications within the spirit and scope of the invention will become apparent to those skilled in the art from this detailed description. Other objects, features and advantages of the present invention will become apparent from the following detailed description.

BRIEF DESCRIPTION OF THE FIGURES

The following drawings form part of the present specification and are included to further demonstrate certain aspects of the invention. Embodiments of the invention may be better understood by reference to one or more of these drawings in combination with the detailed description of specific embodiments presented herein.

DESCRIPTION OF CERTAIN EXEMPLARY EMBODIMENTS

Figure 1:
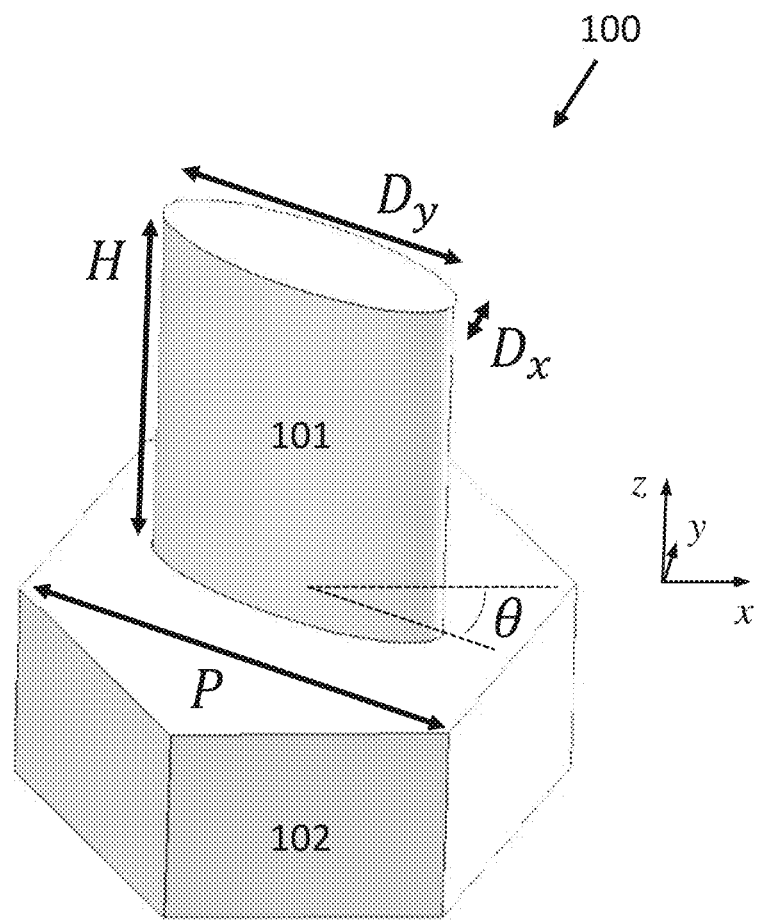
FIG. 1 shows a geometric model of the metasurface's unit cell (100) comprising a nanopillar (101) at each periodic location on top of a substrate (102).

This disclosure provides a design process and apparatus for measuring the spectral intensity and polarization properties of electromagnetic radiation (EMR) collected within the device's aperture as a function of angle of incidence in the y direction. To be used in conjunction with a detector array, such as a focal plane array (FPA) sensor or other suitable camera, the device enables extraction of both the spectral intensity content (how much optical energy is at each electromagnetic wavelength or frequency) and the polarization state (such as the Stokes parameters) at each frequency (i.e., wavelength). The device (a 'metasurface') is a single, ultra-thin (thinner than 2 wavelengths) surface comprising common dielectric materials, such as silicon (Si), silicon dioxide (SiO$_2$), zinc selenide (ZnSe), zinc sulfide (ZnS), silicon nitride (Si$_3$N$_4$), germanium (Ge), or titanium dioxide (TiO$_2$). The multifunction metasurface can have a circular footprint, square, elliptical, or any other two-dimensional shape large enough to pass the EMR. When placed in front of a detector array at a proper tilt angle, the device passes substantially collimated EMR incident on the aperture of the device and interferes it on the detector array surface. The metasurface is designed to focus distinct wavelengths to distinct positions (i.e., patterns) along the tilted dispersion axis (according to diffractive dispersion laws). For each wavelength, a number (≤3) of focused spectral patterns in the orthogonal axis are encoded and produced by the device, with diffractive power correlated to the incident polarization state. After calibration, and by correlating optical power at each position with spectral and polarization information (i.e., spectral intensity and polarization state), the apparatus allows simultaneous retrieval of spectral and polarimetric data by processing of the 2D data sensed by the detector array. In some embodiments, instead of locating a detector array at the focal plane, relay optics such as a scattering plate and imaging lens can be used to pass the focal plane image to a detector array.

This disclosure solves three un-met needs simultaneously: Improvement of size, weight, and power (SWaP), offering a holographic means for simultaneous extraction of spectral and polarization information designable across a wide range of frequencies (i.e., wavelengths), and the removal of the requirement of mechanical (moving) parts for polarimetry. This apparatus combines a metasurface with a detector array, such as a focal plane array (FPA) sensor, to measure the spectral intensity and polarization state of electromagnetic radiation at each point in the one-dimensional (1D) view of the scene. The resulting 1D image or spatial map contains the spectral intensity of each point in the map. Furthermore, the map contains a polarization characterization for each point in the map as a function of wavelength. According to embodiments described herein, spectral intensity information, spatial information, and/or polarimetric information about the radiation whose passing to the detector array is controlled by the metasurface can be determined and the resulting information can be used in constructing a spectral map of electromagnetic radiation that is incident on the metasurface. The metasurface itself is ultra-thin and ultra-light, greatly compactifying the optical system, which needs only the metasurface, detector array, simple passive optics, and enclosure. Unlike many conventional spectrometers, the apparatus described herein includes polarimetry capabilities. Therefore, the SWaP of a spectropolarimeter incorporating the device is greatly improved. Furthermore, while conventional polarimetry methods require moving parts (such as rotating waveplates and/or polarizers), the holographic nature of this apparatus eliminates this requirement. This not only increases the robustness of a spectropolarimeter by eliminating points of failure, it also decreases the time interval of data collection (i.e., no rotation is needed to measure a single data point). This means the temporal resolution may be increased compared to conventional systems. In some embodiments, the apparatus produces spectral maps at video frame rates or higher, producing, for example, hyperspectral video for a 1D image.

The metasurface is designed to have the three functions: focusing, polarization sensitivity, and spectral dispersion. It comprises an array of 'meta-atoms' or 'meta-units' of dielectric material that simultaneously and arbitrarily control the phase and polarization state of EMR within the bandwidth of operation. These meta-units are herein referred to as nanofeatures (e.g. nanostructures). The nanostructures can be a wide range of geometric shapes. In some embodiments, the nanostructures are nanopillars. In some embodiments, the nanostructures are voids in the patterned dielectric layer, for example, pits with an elliptical cross section. In some embodiments, the array of nanostructures is periodic in both the x and y directions, with center-to-center spacing of P. Seen in FIG. 1, these nanostructures are nanopillars (101) that feature two independent axes of the cross section, $D_x$ and $D_y$, which are chosen at each x-y location in the metasurface to provide independent control of the local phase shift for two orthogonal polarization components of the EMR propagating though the nanofeature, called p$_1$ and p$_2$. In some embodiments used for this description, p$_1$ and p$_2$ are right-hand circularly polarized (RCP) EMR and left-hand circularly polarized (LCP) EMR. The values of $D_x$ and $D_y$, may be the same, or different, for each nanofeature. In one embodiment, at least thirty nanofeatures are present. The phase shift experienced by EMR passing through the metasurface in approximately the z direction is designated as $\phi_R(x,y)$ and $\phi_L(x,y)$ for RCP and LCP polarization states, respectively, which in this embodiment are the two orthogonal polarization components of EMR, p$_1$ and p$_2$, propagating though the nanofeature. The rotation angle θ of the nanofeature relative to the x axis (i.e. the principle in-plane direction θ) provides a phase shift of ±2θ to $\phi_R$ and $\phi_L$, respectively. A common phase shift $\phi_{prop}$ results from the dimensions $D_x$ and $D_y$ of the cross section. In this way, specifying the geometric parameters θ, $D_x$, and $D_y$ provides independent control of $\phi_R$ and $\phi_L$ at each point in the metasurface. Because each nanofeature is rotated by angle θ with respect to the metasurface's x-y plane, the parameters $D_x$ and $D_y$ are labels only and do not necessarily correspond to the nanofeature width in the metasurface's x and y directions. Each nanofeature has a height (H) between $\lambda_{min}/100$ and $2\lambda_{max}$, where $\lambda_{min}$ and $\lambda_{max}$ define the spectral band. In some embodiments, each nanofeature has the same height as the others in the array. In other embodiments, each nanofeature has a height that is independent of the other nanofeatures. In one embodiment, at least two nanofeatures are present, each having a different angle θ. In another embodiment, at least three nanofeatures are present, each having a different angle θ. In yet another embodiment, at least thirty nanofeatures are present, each having a different angle θ.

The phase shifts $\phi_R$ and $\phi_L$ are related to the geometric parameters described above based on the following derivation. For EMR passing through a nanopillar type of nanofeature as described above, the output electric field $|E_{out}\rangle$ is related to the input electric field $|E_{in}\rangle$ as $$|E_{out}\rangle = rot(-\theta)\begin{bmatrix} t_{xx} & 0 \\ 0 & t_{yy} \end{bmatrix} rot(\theta)|E_{in}\rangle$$

where $$|LCP\rangle = \frac{1}{\sqrt{2}}\begin{bmatrix} 1 \\ -i \end{bmatrix} \text{ and } |RCP\rangle = \frac{1}{\sqrt{2}}\begin{bmatrix} 1 \\ i \end{bmatrix},$$

and rot(θ) is the rotation matrix for angle θ.

For RCP incidence, $$|E_{out}\rangle = \frac{t_{xx} - t_{yy}}{2}e^{i2\theta}|LCP\rangle + \frac{t_{xx} - t_{yy}}{2}|RCP\rangle$$

For LCP incidence, $$|E_{out}\rangle = \frac{t_{xx} - t_{yy}}{2} e^{i2\theta} |RCP\rangle + \frac{t_{xx} - t_{yy}}{2} |LCP\rangle$$

Setting $$\frac{t_{xx} - t_{yy}}{2} = 0 \text{ and } \frac{t_{xx} - t_{yy}}{2} = e^{i\phi_{prop}} \text{ yields}$$

$\phi_R = \phi_{prop} + 2\theta$ and $\phi_L = \phi_{prop} - 2\theta$.

Figure 2:
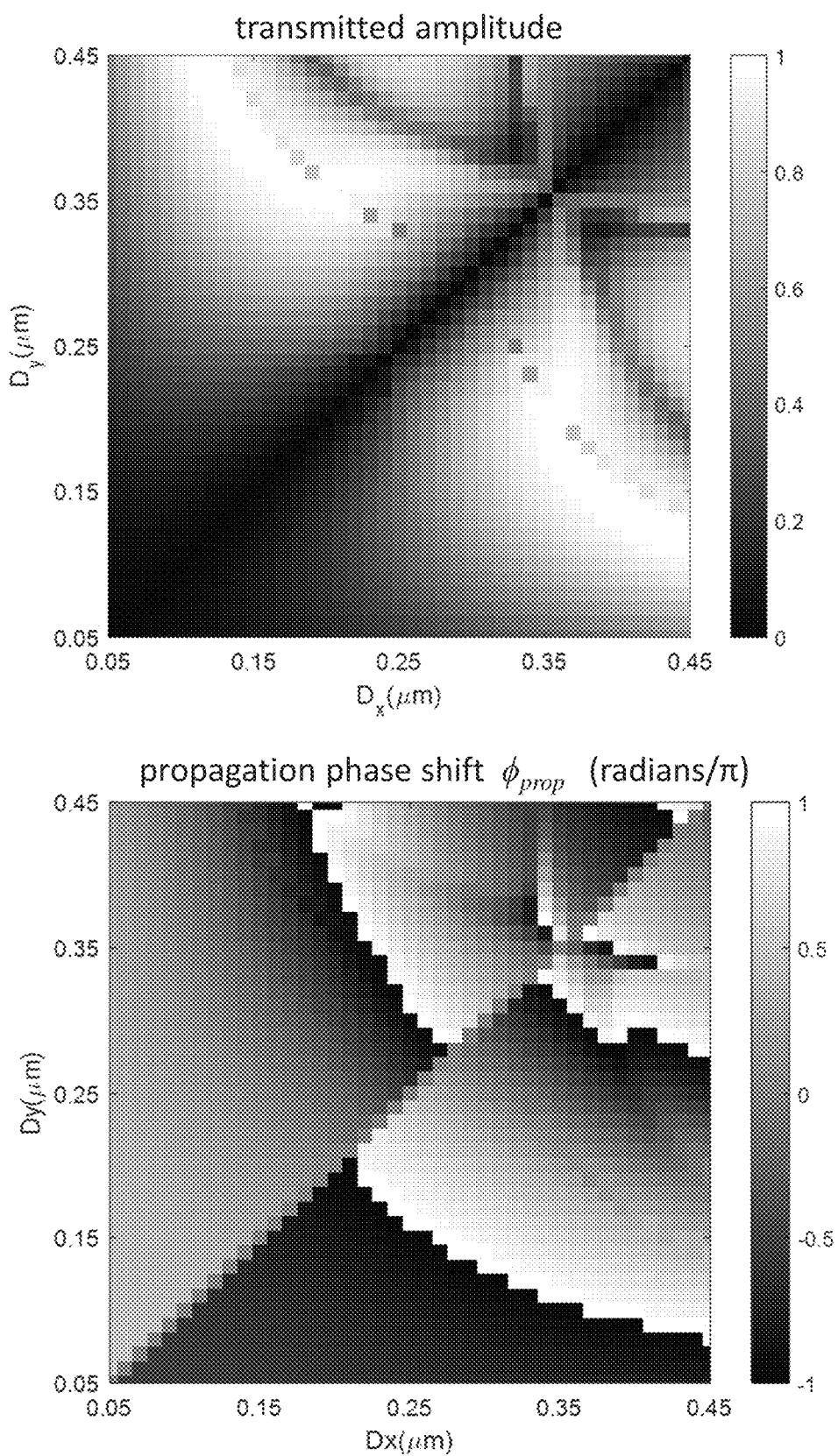
FIG. 2 shows simulation results for the nanopillars, showing the amplitude and propagation phase shift ($\phi_{prop}$) of transmitted circularly polarized EMR for a range of dimensions of the cross section of the nanopillars.

This derivation shows that for any nanopillar design these three parameters, $t_{xx}$ and $t_{yy}$ and $\theta$, provide dependent control of phase shift for RCP and LCP, which in this embodiment are the two orthogonal polarization components of EMR, $p_1$ and $p_2$, propagating though the nanofeature. The expressions for the phase shifts $\phi_R$ and $\phi_L$ as a function of geometric parameter $\theta$ and the complex transmittance parameters $t_{xx}$ and $t_{yy}$, appear in the derivation shown above. The values of the parameters $t_{xx}$ and $t_{yy}$ are each dependent on the nanofeature cross section dimensions $D_x$ and $D_y$ and can be computed using EM modeling and simulation. The dimensions $D_x$ and $D_y$ are varied to construct a library of nanofeature geometries that completely cover the range of necessary phase shifts. Simulation results for one embodiment are shown in FIG. 2, which shows EM simulation results for circularly polarized EMR transmitted through elliptical nanopillars as dimensions $D_x$ and $D_y$ are varied, for both amplitude and propagation phase shift. The phase shifts are achieved for both RCP and LCP incident polarizations, which in this embodiment are the two orthogonal polarization components of EMR, $p_1$ and $p_2$, propagating though the nanofeature. As explained above, independent control of the phase shift for each of the two orthogonal polarization components is achieved by setting angle $\theta$ for each nanofeature in the metasurface. The metasurface can also control the transmittance amplitude at each nanofeature. Generally, the transmittance amplitudes should remain close to unity to maintain high throughput efficiency.

The precise shape of the nanofeature cross section can be elliptical, rectangular, rectangular with rounded corners, and many other shapes. The shape of the cross section need only to have two-fold rotational symmetry, so that the two independent widths, $D_x$ and $D_y$, can be used to control phase shifts $\phi_R$ and $\phi_L$ independently. The exact shape is taken into account when performing EM modeling and simulations. In some embodiments the cross section is elliptical, which is readily microfabricated.

Figure 3:
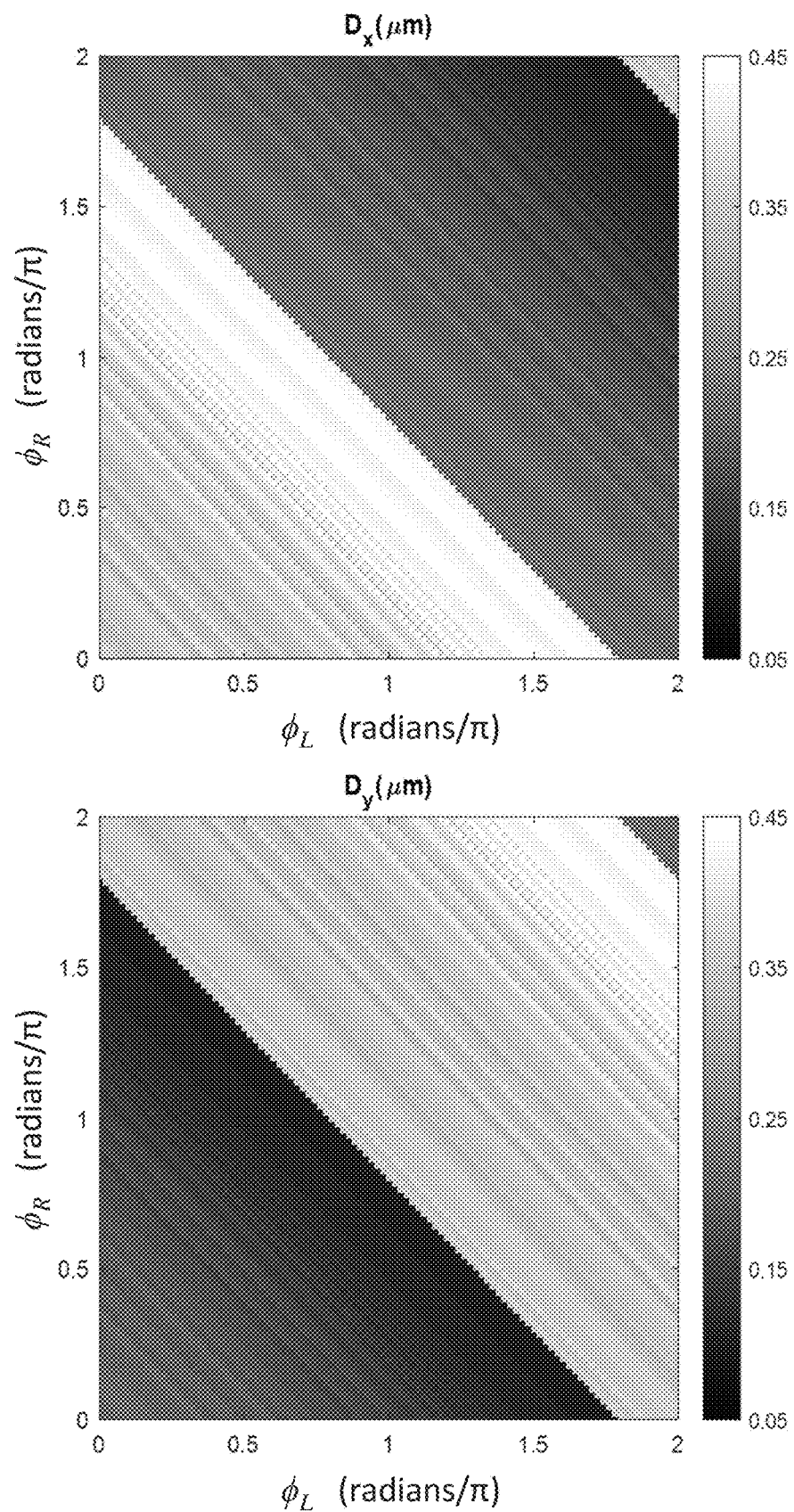
FIG. 3 shows look-up tables indexed by $\phi_L$ and $\phi_R$ for both $D_x$ and $D_y$, based on the electromagnetic (EM) simulation results shown in FIG. 2.

The EM simulation results, such as those shown in FIG. 2, are tabulated into two look-up tables, such as those shown in FIG. 3. This data provides easy transformation from a desired nanofeature functionality to the nanofeature geometry producing the desired phase shifts.

Figure 4:
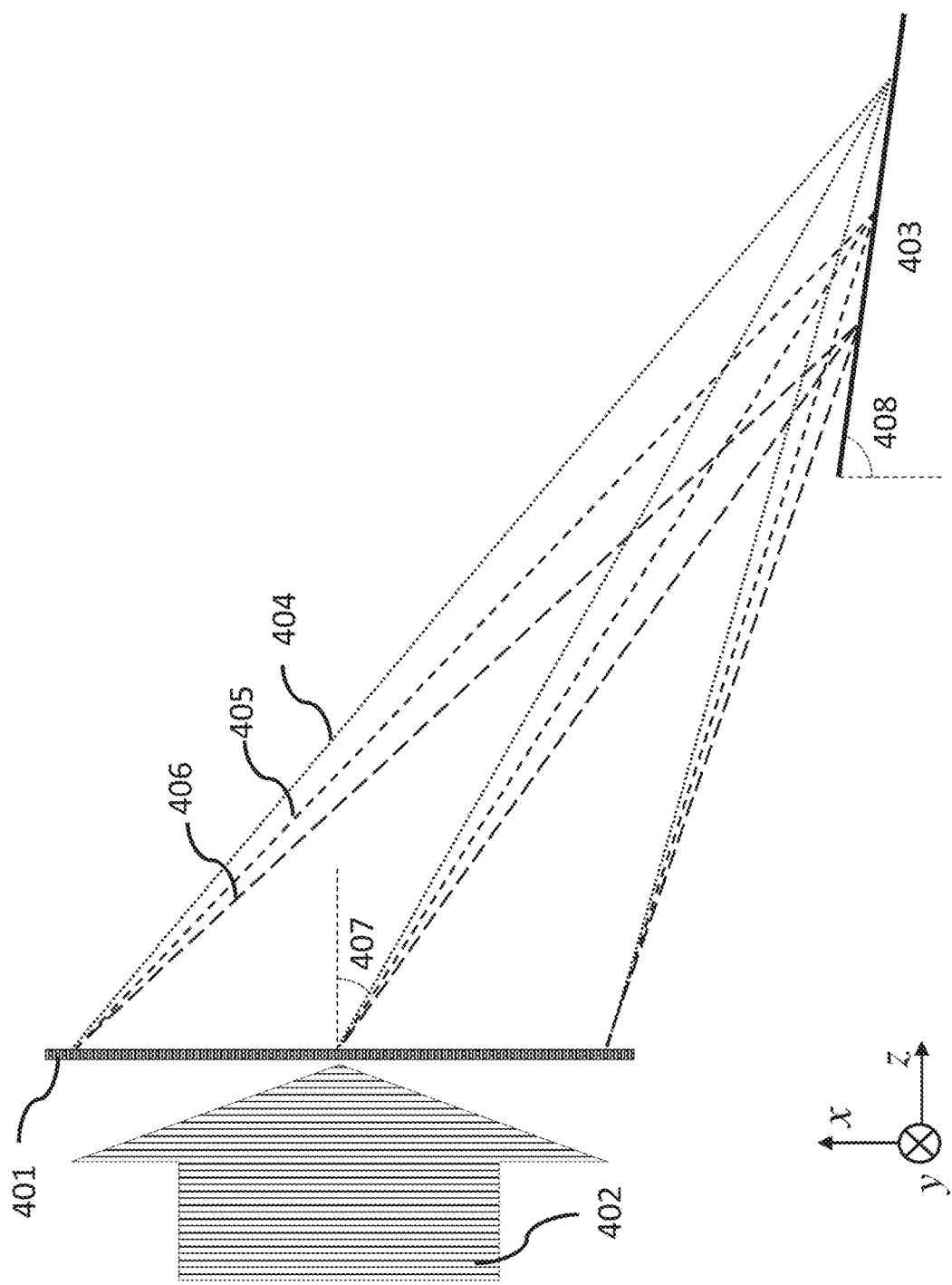
FIG. 4 illustrates off-axis focusing with a ray tracing simulation for the multifunction metasurface (401) showing incident EMR (402) focusing spectral patterns to a tilted off-axis focal plane (403).

The multifunctional metasurface is designed to be illuminated by substantially collimated EMR. As shown in the schematic in FIG. 4, the metasurface (401) focuses incident EMR (402) off-axis by angle $\alpha$ (407) perpendicular to the y direction to produce a spectral spread approximately along a diagonal line in an x-z plane. The shape of the focused EMR can be approximated by a focal plane (403) at an angle (408) relative to the metasurface (401). For a focusing metasurface (sometimes called a metalens) with a nominal focal length F at a wavelength $\lambda$ the desired phase shift $\phi(x,y)$ to focus EMR off-axis at angle $\alpha$ as shown in FIG. 4 is:

$$\phi(x, y) = -\frac{2\pi}{\lambda}\left[\sqrt{z_F^2 + (x - x_F)^2 + (y - y_F)^2} - F\right]$$

where $z_F = F\cos(\alpha)$ and $x_F = F\sin(\alpha)$.

Figure 5A:
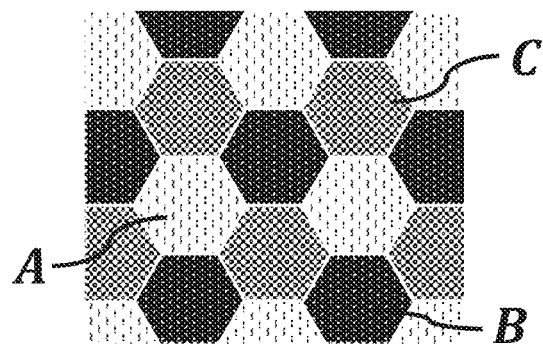
FIG. 5A shows a schematic of the spatial multiplexing of nanofeature unit cells for 3 different component metasurfaces, A, B, and C, that combine to make the multifunction metasurface.
Figure 5B:
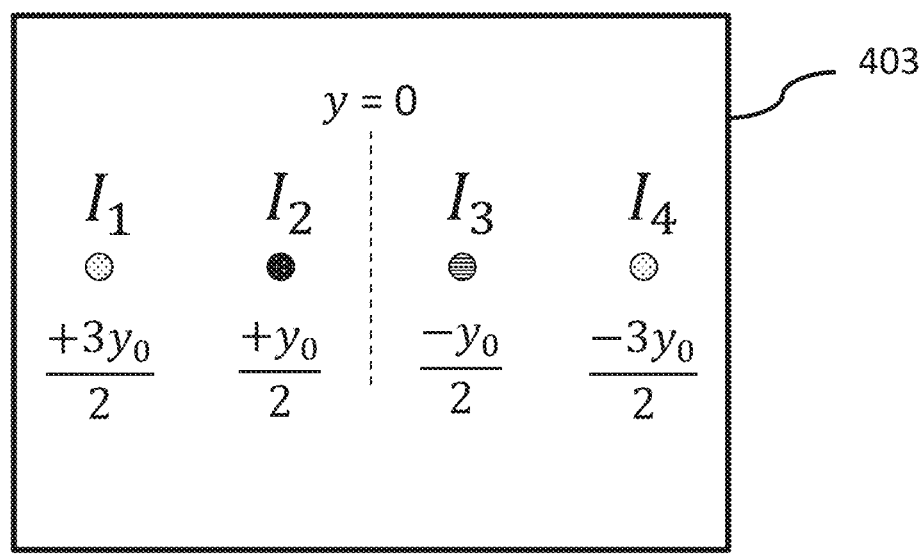
FIG. 5B shows an example of interlacing in a triangular pattern, which can be used to interlace three component metasurfaces.

The coordinates $(x_F, y_F, z_F)$ indicate the position of the focal spot, with the meta-optic centered at (0,0,0). The $y_F$ term provides vertical offset of the focal spot by $y_F$ in the y direction. In some embodiments, as shown in FIG. 5A, the multifunctional metasurface is designed as three superimposed (spatially multiplexed) focusing metasurface, each focusing EMR differently and dependent on the polarization state of the incident EMR. The three component metasurfaces (labeled A, B, and C in in FIG. 5A) function together to focus incident EMR to a total of four different foci patterns (labeled $I_1, I_2, I_3$ and $I_4$ in FIG. 5B) at the focal plane (403). The metasurface is designed to focus incident EMR with center wavelength $\lambda_c$ to near the middle of the detector array active region. Due to spectral dispersion, broadband incident EMR spreads in approximately the direction perpendicular to the y direction. In other embodiments, the interlacing can be other patterns, for example, checkerboard for two component metasurfaces or square for four component metasurfaces. In some embodiments the component metasurfaces can occupy equal proportions of the total area of the composite metasurface. In other embodiments the component metasurfaces can occupy different proportions of the total area of the composite metasurface to, for example, focus a larger proportion of the incident EMR power to a particular spectral pattern.

Figure 6:
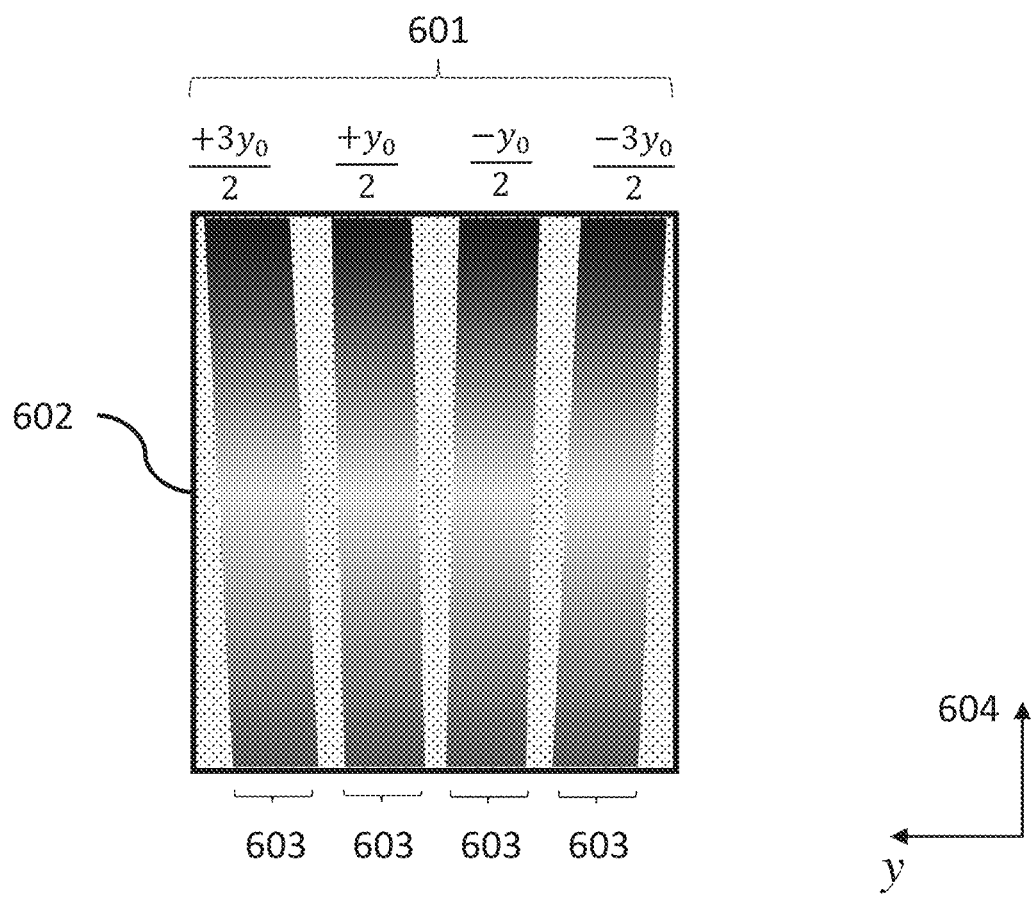
FIG. 6 shows the approximate orientation of four spectrally dispersed foci patterns (601) at the detector array (602).

In this embodiment, the component metasurface A separates RCP and LCP EMR, focusing them to two separate patterns, which in some embodiments are centered at $y=+3y_0/2$ and at $y=-3y_0/2$ respectively. Component metasurface B focuses RCP and LCP EMR to a single spot separate from the others, which in some embodiments is centered at $y=+y_0/2$. Similarly, component metasurface C focuses RCP and LCP EMR to a single spot but with a $\pi/2$ phase shift added to the LCP component; this spot is separate from the others, which in some embodiments is centered at $y=-y_0/2$. The EMR exiting the metasurface transmits through a linear polarizer called an analyzer. The analyzer between the metasurface and the detector array passes only EMR that is not polarized in the y direction. The analyzer also forces the passed linearly polarized EMR at each location to interfere, giving the measured irradiance patterns ($I_1, I_2, I_3,$ and $I_4$) of the four spectral patterns a complete set of information about the polarization state of the incident EMR. The detector array is aligned with this spectral spread to measure the four spectral patterns as a function of wavelength. FIG. 6 shows the approximate orientation of the four spectrally dispersed foci patterns (601) at the detector array (602). The four patterns are separated from each other in the y direction. EMR within each of the four patterns spreads (603) in the y direction as a function of image information, i.e., the spread corresponds to a mapping of the incident EMR as a function of angle of incidence in the y direction. Each of the four patterns is spectrally dispersed in approximately a direction perpendicular (604) to the y direction.

The measured irradiance at each wavelength in each of the dispersed foci patterns is called $I_n(\lambda)$. In embodiments with four dispersed patterns the measured irradiance is $I_1(\lambda)$, $I_2(\lambda)$, $I_3(\lambda)$ and $I_4(\lambda)$. These four measured intensities are used to retrieve a complete description of the polarization state of the incident EMR using all four Stokes parameters or any other commonly used polarization descriptors. The three interlaced component metasurfaces are designed to encode this information into the irradiance of the linearly polarized component of the four focused spectral patterns as a function of wavelength. The local phase shifts for each of the three interlaced metasurfaces (A, B, and C) that combine to make the multifunction metasurface in the embodiments described above are expressed as follows:

$$\phi_R^{(A)} = -\frac{2\pi}{\lambda_c}\sqrt{z_f^2 + (x - x_f)^2 + (y - 3y_0/2)^2}$$

$$\phi_L^{(A)} = -\frac{2\pi}{\lambda_c}\sqrt{z_f^2 + (x - x_f)^2 + (y - 3y_0/2)^2}$$

$$\phi_R^{(B)} = -\frac{2\pi}{\lambda_c}\sqrt{z_f^2 + (x - x_f)^2 + (y - y_0/2)^2}$$

$$\phi_L^{(B)} = \phi_R^{(B)}$$

$$\phi_R^{(C)} = -\frac{2\pi}{\lambda_c}\sqrt{z_f^2 + (x - x_f)^2 + (y - y_0/2)^2}$$

$$\phi_L^{(C)} = \phi_R^{(C)} + \frac{\pi}{2}$$

The polarization state of the incident EMR can be described by the four Stokes parameters ($S_0$, $S_1$, $S_2$, $S_3$), which are sometimes called the polarization vector and represented as (I, Q, U, V). Other commonly used descriptors of polarization state can also be easily derived, such as the degree of polarization (DoP) or the degree of linear polarization (DoLP). The theoretical algebraic expressions for retrieving polarization state parameters from the irradiances of the four focused patterns are:

$$S_0 = I = 3(I_1 + I_4)$$

$$S_1 = Q = 1 - \frac{I_2}{I_1 + I_4}$$

$$S_2 = U = 1 - \frac{I_3}{I_1 + I_4}$$

$$S_3 = V = \frac{I_4 - I_1}{I_1 + I_4}$$

These equations show the straightforward retrieval of a complete description of the incident polarization state. The four Stokes parameters completely describe the polarization state of the incident EMR and are calculated using the four focused pattern intensities measured at each wavelength, i.e., location on the detector array. These parameter values identify the polarization of the incident EMR, be it linear, circular, or elliptical. For example, when $S_1=S_2=0$ and $S_3=S_0$ the incident EMR is RCP. Other commonly used descriptors of polarization state can also be easily derived, such as the degree of polarization (DoP) or the degree of linear polarization (DoLP). The algebraic expressions for retrieving DoP and DoLP are $$DoP = \frac{\sqrt{S_1^2 + S_2^2 + S_3^2}}{S_0}$$

The detector array senses EMR intensity data and sends it to a computation module that converts the data into the spectral map using the equations listed above to derive spectral intensity and polarization state for each location in the map, i.e., image pixel. In some embodiments, the detector array is an FPA linked to a computer or microprocessor to perform the calculations and output spectral maps. The computational algorithm converts the four measured intensities, $I_1(\lambda)$, $I_2(\lambda)$, $I_3(\lambda)$, and $I_4(\lambda)$, into descriptors of polarization state, particularly the Stokes parameters. Each of the four polarization-dependent patterns extends in the y dimension to map the image information.

The ray trace simulation in FIG. 4 illustrates the designed focusing and spectral dispersion behavior of a multifunctional metasurface. The rays shown correspond to the shortest (404), center (405), and longest (406) wavelengths of interest. The EMR emerges from the metasurface off axis by a specific angle (407), which is designed to be approximately 32° for the center wavelength. The tilted focal plane is at an angle (408) of approximately 72° relative to the (x-y) plane of the metasurface. In one embodiment, the metasurface is designed to have the following geometric design parameters: diameter 0.4 mm, period P=900 nm, height H=1200 nm, offset between the center of each of the four foci $y_0$=0.1 mm for the center wavelength, focal plane at $z_f$=1.78 mm and $x_f$=0.908 mm, and a resulting dispersion at the focal plane of 2.0891 µm/nm, meaning that a spectral width of 200 nm spans a 208 µm width of the focal plane.

Figure 7:
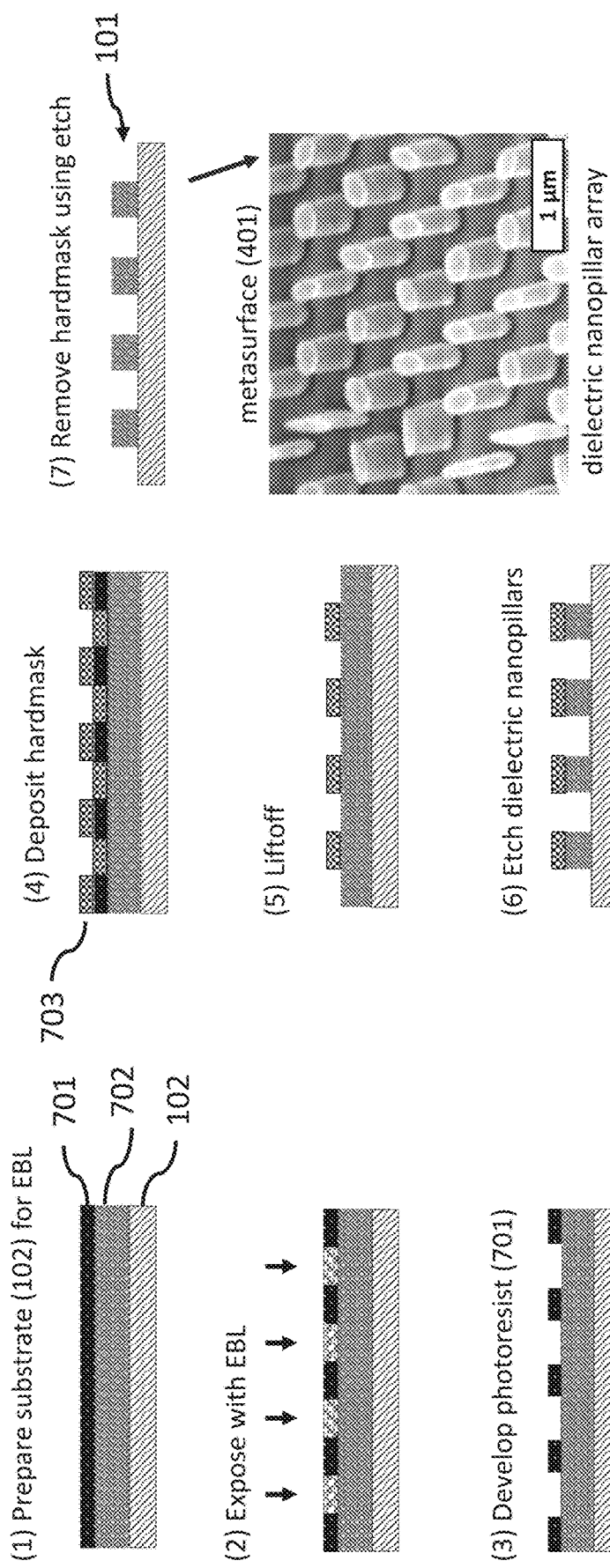
FIG. 7 shows the major nanofabrication process steps for the multifunction metasurface when EBL is used.

In one embodiment, nanofabrication follows the hard mask process shown in FIG. 7. In one embodiment, an all-dielectric metasurface comprises a patterned dielectric thin film (702) such as amorphous silicon (a-Si) or titanium dioxide ($TiO_2$). The patterned dielectric is on top of a transparent dielectric substrate (102) such as fused silica ($SiO_2$). Fabrication begins with the deposition of the dielectric thin film to be patterned (702), for example, plasma-enhanced chemical vapor deposition (CVD). Patterning of the dielectric thin film begins by applying a thin photoresist (701) and writing the desired pattern into it using electron-beam lithography (EBL). After development of the photoresist, a thin layer of hardmask material (703) such as nickel (Ni) or alumina ($Al_2O_3$) is deposited, which adheres to the dielectric thin film in areas where the photoresist has been removed. Liftoff of the photoresist, such as using a N-methyl pyrrolidone (NMP) heated bath, leaves a patterned hardmask directly on the dielectric. Deep etching such as reactive ion etching (RIE) removes dielectric thin film material around the hardmask, leaving a metasurface (401) highly uniform nanopillar structures with smooth vertical or slightly tilted walls.

Figure 8:
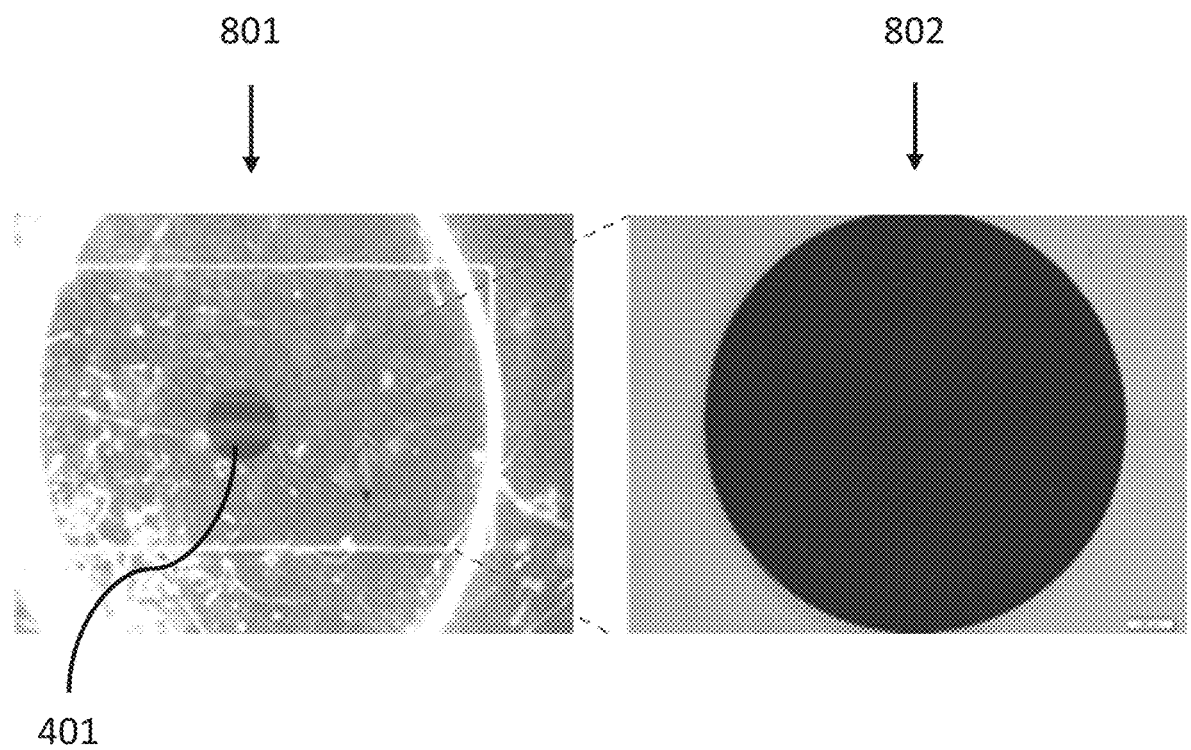
FIG. 8 shows a photograph (801) of a 5 mm diameter multifunction metasurface (401), and a microscope image (802) of the same.

FIG. 8 shows an example of a 5 mm diameter multifunction metasurface used to perform spectropolarimetry for SWIR light with wavelength approximately 1290-1690 nm. In visible light the metasurface appears dark due to the array of a-Si nanofeatures but is transparent in the SWIR spectral band. The silica substrate is transparent.

Figure 9:
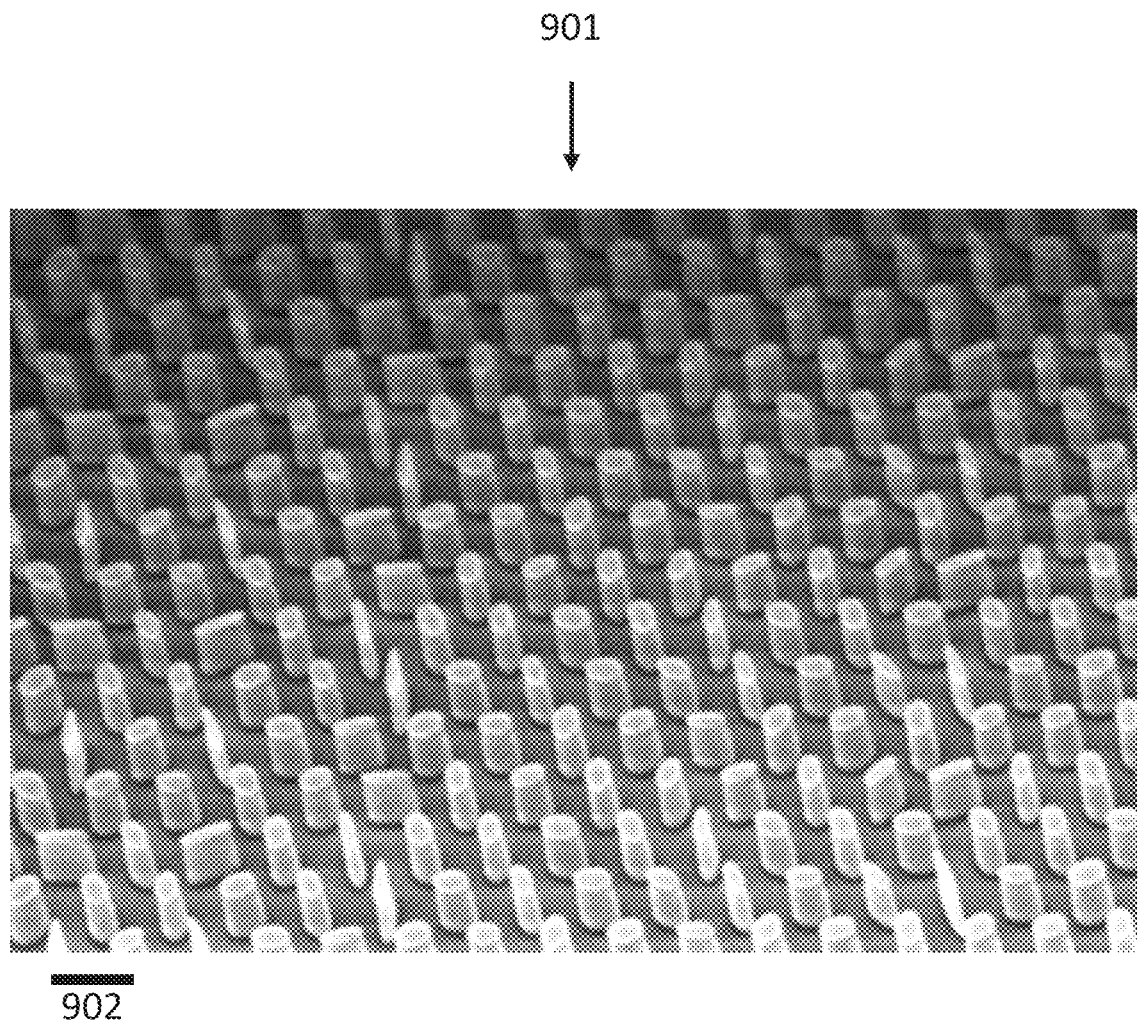
FIG. 9 shows a scanning electron microscope (SEM) image (901) of the multifunction metasurface shown in FIG. 8, with a scale bar (902) 1 micrometer in length.

FIG. 9 shows an SEM image (901) of the metasurface in FIG. 8. The SEM image of the metasurface also shows the variety of nanopillar geometries incorporated into the interlaced multifunction metasurface to form an array.

Figure 10A:
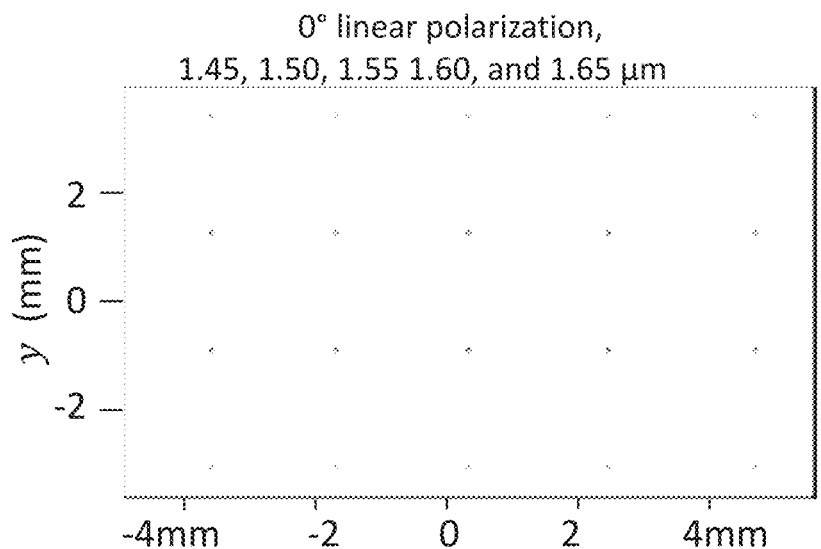
FIGS. 10A-C show focal plane simulations of spectral patterns for incident SWIR light focused by a typical metasurface, with FIG. 10A showing 0° linear polarization simultaneously at wavelengths 1.45, 1.50, 1.55 1.60, and 1.65 micrometer, FIG. 10B showing RCP monochrome light at 1.550 micrometer, and FIG. 10C showing LCP monochrome light at 1.55 micrometer.
Figures 10B, 10C:
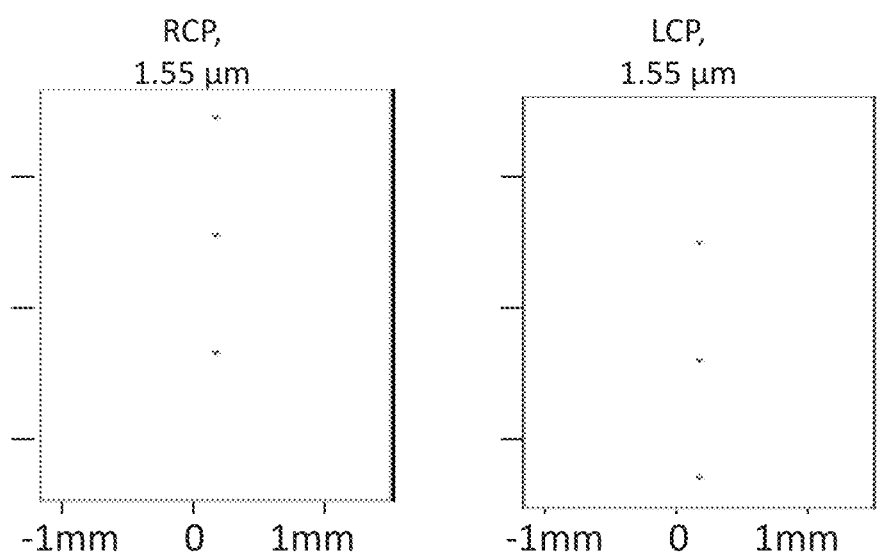

FIGS. 10A-C show simulations of focusing by the multifunction metasurface to the focal plane for incident shortwave infrared (SWIR) light. These images were modeled and simulated using a metasurface designed for the optical arrangement shown in FIG. 4. Incident EMR at different wavelengths focused to different locations at the focal plane as designed. FIG. 10A shows the result when incident light has 0° linear polarization and multiple simultaneous wavelengths. FIG. 10B shows the results with incident RCP monochrome light at 1.550 micrometers. FIG. 10C shows the results with incident LCP monochrome light at 1.550 micrometers.

Figure 11:
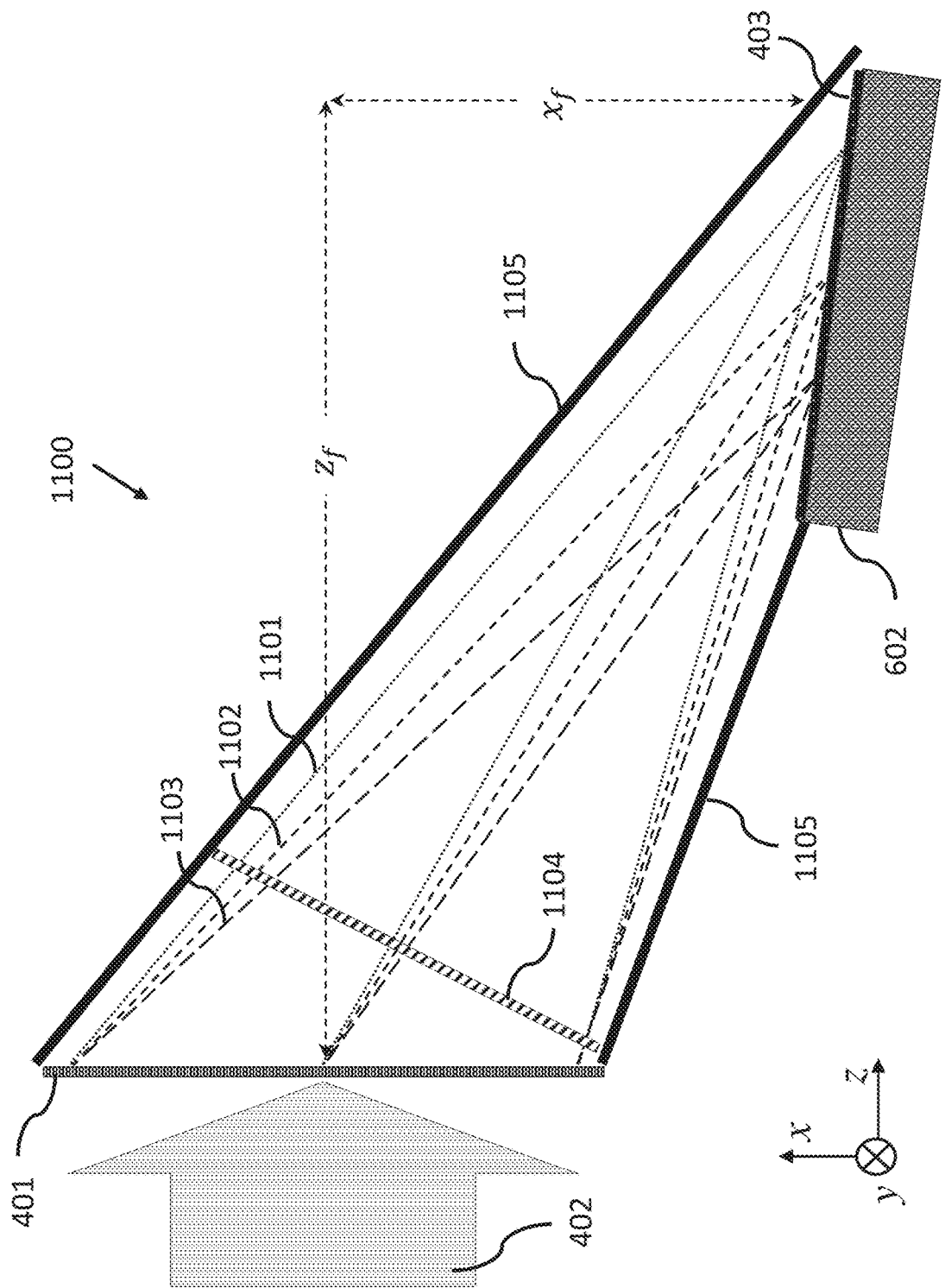
FIG. 11 shows a schematic (1100) of the optics of a spectropolarimeter design incorporating the multifunction metasurface (401) including a ray trace simulation of the beam paths from the metasurface to the slanted focal plane (403) at the detector array (602) centered at $(x_f, z_f)$=(15 mm, 30 mm).

FIG. 11 shows a schematic (1100) of one embodiment of the spectropolarimeter incorporating the multifunction metasurface (401). FIG. 11 shows the optics of this embodiment including a ray trace simulation of the spectrally spread focused EMR from the metasurface to the slanted focal plane (403) at the detector array (602) centered at ($x_f$, $z_f$)=(9.8 mm, 13.9 mm). The detector array (602) is coincident with the spectrally dispersed focal plane (403). The rays shown correspond to the shortest (1101), center (1102), and longest (1103) wavelengths of interest. In this embodiment these wavelengths are 686 nm, 729 nm, and 772 nm, respectively. As illustrated in FIG. 11, a linear polarizer (1104) is located immediately after the multifunction metasurface to act as an analyzer to pass only EMR that is not polarized in the y direction. Mechanical mounts (not shown) hold the analyzer and other components in place. Ultrablack baffling or other highly absorbent material is built into the body of the spectropolarimeter around the beam paths to reduce stray EMR. The analyzer provides interference at the focal plane between the same linearly polarized components of the RCP and LCP EMR emerging from the metasurface (401). Only linear p-polarized EMR reaches the focal plane (403). Linear p-polarization is sometimes referred to as TM polarization, Short for "transverse magnetic", and characterized by its magnetic field being perpendicular to the plane of incidence.

The linear p-polarization of the EMR that reaches the focal plane (403) can be chosen to maximize coupling into the detector array (602). EMR at the center wavelength is incident at an oblique angle of approximately 72° from normal. Fresnel reflections at the interface from air to the detector array can be large at such a steep angle. However, in this embodiment, the analyzer leaves only p-polarized EMR at the detector array to take advantage of the low Fresnel reflectivity near the Brewster's angle. For example, in this embodiment a Si FPA sensor can be used as the detector array, and Si has a refractive index of ~3.7 at a center wavelength 729 nm, making the Brewster's angle approximately 75°. The incident focused EMR diffracts at approximately 35° for the center wavelength and is incident at the FPA at angle approximately 72°, which is close enough to the Brewster's angle to keep Fresnel reflections to less than 1%, reducing stray EMR and increasing SNR. Unwanted reflection of EMR from the detector array can be further reduced in the future using an antireflective layer. In some embodiments the spectropolarimeter optical design includes highly absorptive ultra-black coatings inside its walls (1105) and on the internal baffling to reduce scattered EMR and maximize SNR at the detector array.

In one embodiment, illustrated in FIG. 11, the multifunction metasurface is elliptical, 10 mm×5 mm. It is wider in the spectral dimension to provide higher spectral resolution by focusing to smaller spot sizes. The f-number of the meta-optic—its ratio of focal length to diameter—can be chosen to make the point spread function (PSF) small enough to approximately match the pixel pitch of the FPA detector array with 2048 by 2048 pixels and an active area of 13.3 mm square. The metasurface is designed with off-axis focusing angle α=35° and F=17 mm, and therefore $z_f$=13.9 mm and $x_f$=9.8 mm. The parameter $y_0$=3.1 mm to accommodate the detector array. Modeling estimates the spectral resolution of 0.1 nm with 909 spectrally resolvable wavelength bins for this embodiment. Other parameter values for this embodiment are P=306 nm and height H=1070 nm.

The computational algorithm for the spectropolarimeter rapidly retrieves data describing the spectral intensity and polarization state of incident radiation. Computation can be implemented on a standard computer or on a compact compute module for control, processing, and communication functions. The metasurface is designed such that the spectral data can be directly retrieved from the spectrally spread patterns at the focal plane. The algorithm collects and combines the four focused spectral patterns from the detector array at the focal plane. In some embodiments the computational algorithm performs a variable scaling operation to compensate for the slightly bowed mapping of the four focused patterns to the detector array. The scaling operation is generally referred to as a distortion correction computation. In some embodiments the computational algorithm can include an initial process for spectral and spatial calibration. Using known incident EMR, spatial calibration measures the actual mapping of the four spectral patterns at the focal plane and any residual misalignments in the optics. Once calibrated, the data collection combines the four patterns and performs distortion correction based on the initial spatial calibration. The computational algorithm also processes the one-dimensional imaging information. For each measured frame from the detector array, the algorithm calculates the spectral intensity and polarization state of incident radiation for every point in the map (image). The computational algorithm combines and collates the detected data from the regions occupied by the four spectral patterns.

In some embodiments the computational algorithm stores the spectropolarimetric data for each frame. In some embodiments the data passes to other information systems. The spectropolarimetric map is generated for each frame with the option of storing and/or assembling full 2D spectropolarimetric images when used in a pushbroom or scanning configuration. In some embodiments, the algorithm concatenates 1D spectropolarimetric map data to form a spectral data cube containing a synthetic 2D image with spectropolarimetric data for each image pixel (or map element).

Figure 12:
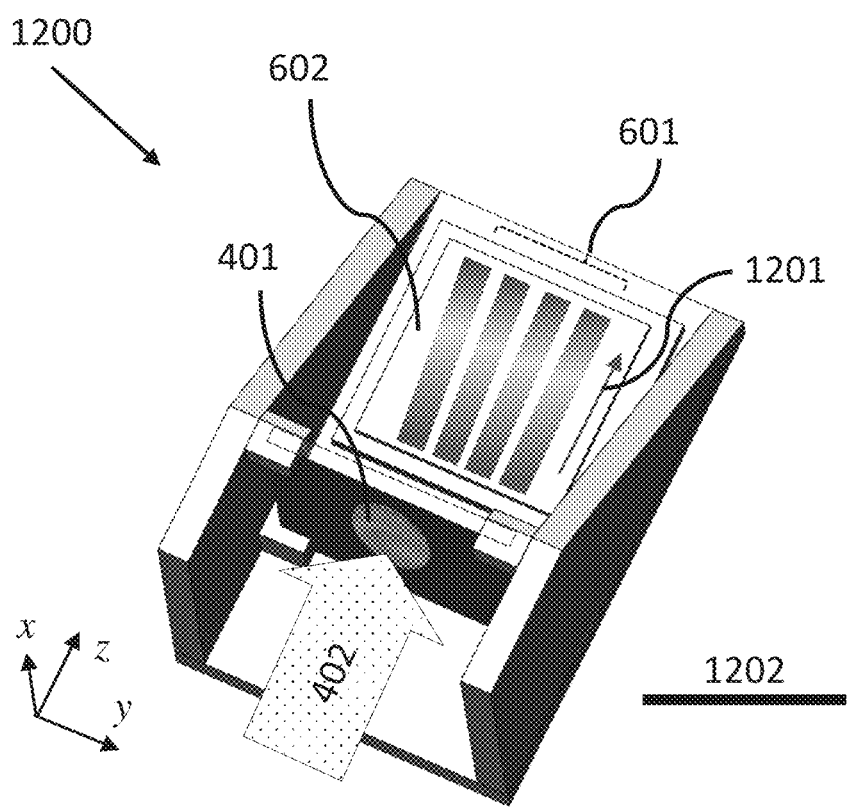
FIG. 12 shows a rendering of one embodiment of the optics of the spectropolarimeter design of FIG. 11 based on the multifunction metasurface (401), which focuses incident EMR (402) to four patterns (601) as a function of incident polarization. The scale bar (1202) is 1 cm in length.

FIG. 12 shows a rendering of the embodiment of the optics of the spectropolarimeter shown in FIG. 11 based on the multifunction metasurface (401), which focuses incident EMR (402) to four spectral patterns (601) as a function of incident polarization. Each of the four patterns exhibits spectral dispersion (1201) at the focal plane on the detector array (602). For illustration purposes in this rendering, parts of the outer body, baffles, and other passive components are not shown.

In some embodiments the multifunction metasurface is designed with two or more interlaced component metasurfaces to focus EMR to three or more spectrally dispersed patterns. The details above describe a common embodiment in which three component metasurfaces are interlaced to focus to four spectrally dispersed patterns that fully characterize the polarization state of the incident EMR. In some embodiments, two interlaced component metasurfaces focus to three dispersed patterns, providing a partial characterization of the polarization state of the incident EMR. In some embodiments, the interlaced component metasurfaces can be designed to focus to dispersed patterns that provide either a partial or full characterization of the polarization state of the incident EMR but also provide specific polarization characterization, for example, a focus that specifically corresponds to a particular polarization state such as LCP.

This disclosure includes embodiments in which the multifunctional metasurface is designed to be illuminated by EMR with near-normal incidence. In other embodiments, the multifunctional metasurface is designed to be illuminated by EMR with a larger, non-zero angle of incidence. In these embodiments, spectral resolution can be altered and/or improved.

Figure 13:
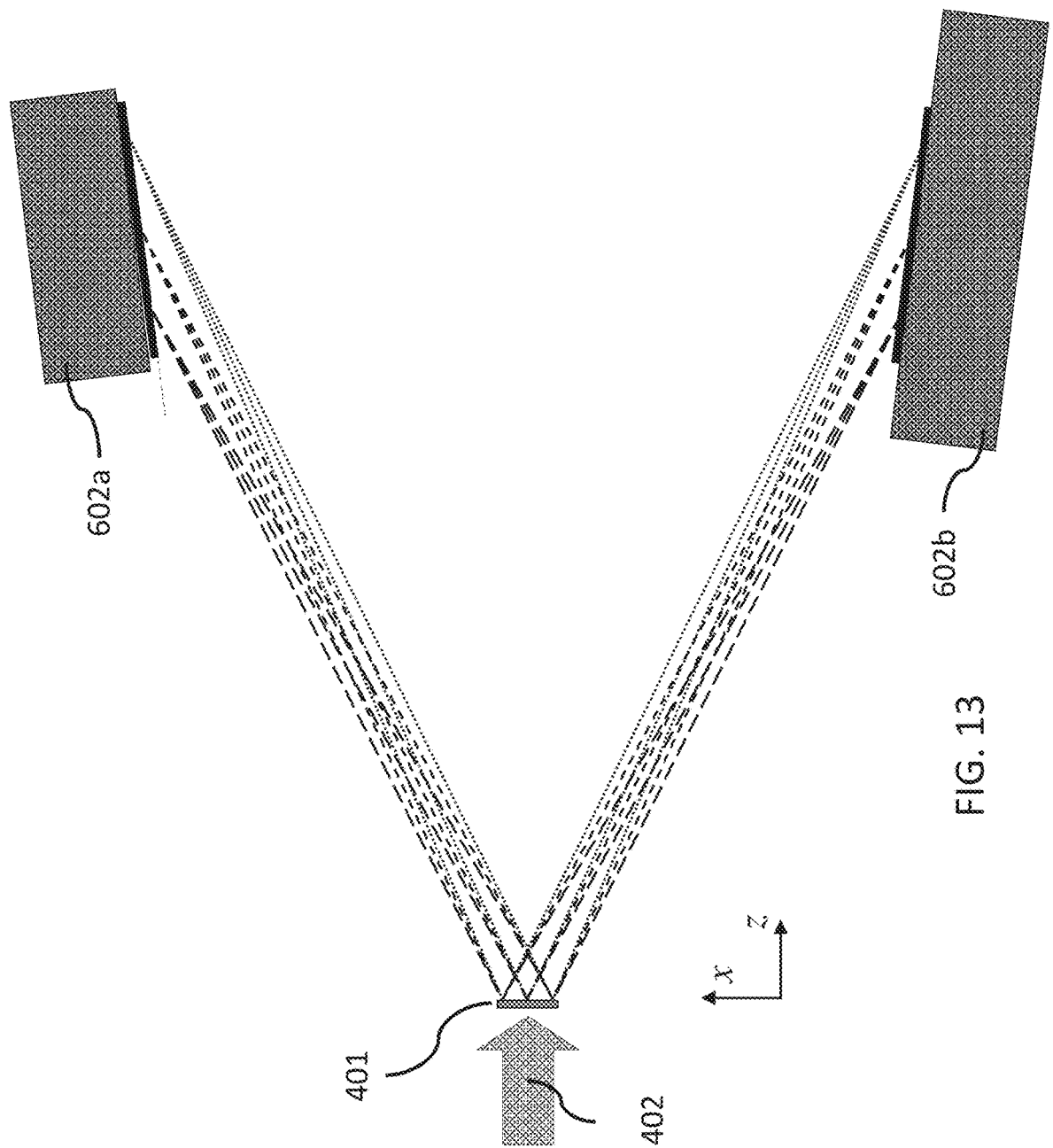
FIG. 13 shows a schematic of an embodiment in which a single multifunction metasurface (401) focuses incident EMR (402) in two different spectral bands to two different detector arrays (602a and 602b).

As illustrated in the schematic in FIG. 13 embodiments in which a single multifunction metasurface (402) is designed and fabricated in such a manner as to cause incident EMR (402) to focus to two or more detector arrays (602a and 602b) to for example generate spectral maps in two or more spectral bands.

This disclosure includes embodiments in which a single multifunction metamaterial is designed and fabricated to perform the three functions of focusing incident EMR while simultaneously analyzing spectral intensity and polarization state. Optical metamaterials generally occupy a volume rather than just a surface. Optical metasurfaces are the single-layer form of metamaterials and have been applied to a wide range of optical phenomena, including ultrathin focusing lenses or metalenses. Like optical metasurfaces, optical metamaterials can be designed to have multiple function, including the imaging spectropolarimeter described herein.

This disclosure includes embodiments that measure EMR. Embodiments can be designed to measure one or more of the following types of EMR: x-rays, ultraviolet light, visible light, IR light, millimeter wave radiation, or any other radiation considered to be part of the electromagnetic spectrum.

The terms "focal plane" and "focal plane array" are common terms that may refer to planar surfaces or surfaces that are only approximately planar or surfaces that are substantially curved, such as concave or convex surfaces. The term "focal plane" refers to the plane-like surface that EMR is commonly focused to by an optic, even though the surface may not be perfectly planar. The term "focal plane array" refers to a detector array used to sense and transduce incident EMR, even though some FPAs are not strictly planar and may be curved.

While the invention has been described with reference to certain embodiments, it will be understood by those skilled in the art that various changes may be made and equivalents may be substituted for elements thereof to adapt to particular situations without departing from the scope of the disclosure. Therefore, it is intended that the claims not be limited to the particular embodiments disclosed, but that the claims will include all embodiments falling within the scope and spirit of the appended claims.

Upon reading this disclosure, a person having ordinary skill in the art will be able to understand the embodiments described herein that use a metasurface to construct a spectropolarimeter for analyzing EMR in a variety of different settings. Select embodiments can be useful for identifying materials, quantifying airborne aerosols, and for revealing electronic or vibrational transitions in a material. Some material when excited by lasers may exhibit Raman emission modes and chemically unique spectroscopic signatures that can be determined and mapped using the device described herein to determine a material's composition and/or microstructure. In some aspects, by comparing a spectral map or data array determined using the embodiments described herein with spectra from a database or a spectral model, it is possible to identify chemical, mineral, and biological elements. In some aspects, useful methods for comparing spectra include matched filters and correlation analysis. In addition, the use of spatial sensitivity and spatial mapping can provide additional information that can be exploited for the identification of structures. By way of example only, camouflaging may affect perception or appearance of a structure or scene such that it visually appears to be identical to a different structure or scene of an environment. However, when certain embodiments are used to determine the spectral signature of the camouflaged structure or region, the signature is unique and identifiable as being different from the item or region it was intended to resemble or mimic. Furthermore, the spatial extent of the camouflage can be determined from the spectral map. In another exemplary embodiment a pair of spectral maps may be used to form a spectrally resolved disparity map, which can increase the accuracy of passive computer stereo vision relative to intensity disparity maps.

What is claimed is:

1. A metasurface comprising:
   a substrate layer that is optically transparent throughout a spectral range, the spectral range defined by a smallest wavelength $\lambda_{min}$ and a largest wavelength $\lambda_{max}$)
   a structured dielectric layer comprising an optically transparent material that is optically transparent over the spectral range, the structured dielectric layer consisting of multiple asymmetric nanofeatures, each having a height (H) between $\lambda_{min}/100$ and $2\lambda_{max}$;
   wherein the multiple asymmetric nanofeatures comprise at least:
   a first nanofeature with a first length ($D_{y1}$) along a first principal in-plane direction ($\theta_1$) and a first width ($D_{x1}$) along a second in-plane direction orthogonal to the first principal in-plane direction, tailored to scatter, with different patterns, one polarization state of electromagnetic radiation $p_1$ and one orthogonal polarization state of electromagnetic radiation $p_2$
   a second nanofeature with a second length ($D_{y2}$) along a second principal in-plane direction ($\theta_2$) and a second width ($D_{x2}$) along a third in-plane direction orthogonal to the second principal in-plane direction, tailored to scatter, with same patterns and different phase shift ($\phi$), one polarization state of electromagnetic radiation $p_1$ and one orthogonal polarization state of electromagnetic radiation $p_2$;
   wherein each of the first length ($D_{y1}$) and the second length ($D_{y2}$) are between $\lambda_{min}/100$ and $\lambda_{min}$ in size,
   wherein each of the first width ($D_{x1}$) and the second width ($D_{x2}$) are between $\lambda_{min}/100$ and $\lambda_{min}$ in size.

2. The metasurface as recited in claim 1, wherein the first length ($D_{y1}$) and the second length ($D_{y2}$) are identical.

3. The metasurface as recited in claim 1, wherein the first length ($D_{y1}$) and the second length ($D_{y2}$) are different.

4. The metasurface as recited in claim 1, wherein the first width ($D_{x1}$) and the second width ($D_{x2}$) are identical.

5. The metasurface as recited in claim 1, wherein the first width ($D_{x1}$) and the second width ($D_{x2}$) are different.

6. The metasurface as recited in claim 1, wherein the first principal in-plane direction ($\theta_1$) and the second principal in-plane direction ($\theta_2$) are identical.

7. The metasurface as recited in claim 1, wherein the first principal in-plane direction ($\theta_1$) and the second principal in-plane direction ($\theta_2$) are different.

8. The metasurface as recited in claim 1, wherein the multiple asymmetric nanofeatures are arrayed across the structured dielectric layer, and the first length ($D_{y1}$), the second length ($D_{y2}$), the first width ($D_{x1}$), the second width ($D_{x2}$), the first principal in-plane direction ($\theta_1$), and the second principal in-plane direction ($\theta_2$), are identical in at least two asymmetric nanofeatures.

9. The metasurface as recited in claim 1, wherein the multiple asymmetric nanofeatures are posts with an elliptical shape or a rectangular shape.

10. The metasurface as recited in claim 1, wherein the multiple asymmetric nanofeatures are voids with an elliptical shape or a rectangular shape.

11. The metasurface as recited in claim 1, wherein the structured dielectric layer comprises, silicon, silicon dioxide, zinc selenide, zinc sulfide, silicon nitride, germanium, or titanium dioxide.

12. A metasurface comprising:
a substrate layer that is optically transparent throughout a spectral range defined by a smallest wavelength $\lambda_{min}$ and largest wavelength $\lambda_{max}$;
a structured dielectric layer comprising an optically transparent material that is optically transparent over the spectral range, the structured dielectric layer consisting of multiple asymmetric nanofeatures, each having a height (H) between $\lambda_{min}/100$ and $2\lambda_{max}$;
wherein the multiple asymmetric nanofeatures comprise at least:
a first nanofeature with a first length ($D_{y1}$) along a first principal in-plane direction ($\theta_1$) and a first width ($D_{x1}$) along a second in-plane direction orthogonal to the first principal in-plane direction, tailored to scatter, with different patterns, one polarization state of electromagnetic radiation $p_1$ and one orthogonal polarization state of electromagnetic radiation $p_2$;
a second nanofeature with a second length ($D_{y2}$) along a second principal in-plane direction ($\theta_2$) and a second width ($D_{x2}$) along a third in-plane direction orthogonal to the second principal in-plane direction, tailored to scatter, with same patterns and different phase shift ($\phi$), one polarization state of electromagnetic radiation $p_1$ and one orthogonal polarization state of electromagnetic radiation $p_2$
a third nanofeature with a third length ($D_{y3}$) along a third principal in-plane direction ($\theta_3$) and a first width ($D_{x1}$) along a fourth in-plane direction orthogonal to the third principal in-plane direction, tailored to scatter, with same patterns and different phase shift ($\phi$), one polarization state of electromagnetic radiation $p_1$ and one orthogonal polarization state of electromagnetic radiation $p_2$
wherein each of the first length ($D_{y1}$), the second length ($D_{y2}$) and the third length ($D_{y3}$) are between $\lambda_{min}/100$ and $\lambda_{min}$ in size,
wherein each of the first width ($D_{x1}$), the second width ($D_{x2}$) and the third width ($D_{x3}$) are between $\lambda_{min}/100$ and $\lambda_{min}$ in size.

13. The metasurface as recited in claim 12, wherein the first length ($D_{y1}$), the second length ($D_{y2}$) and the third length ($D_{y3}$) are identical.

14. The metasurface as recited in claim 12, wherein the first length ($D_{y1}$), the second length ($D_{y2}$) and the third length ($D_{y3}$) are different.

15. The metasurface as recited in claim 12, wherein the first width ($D_{x1}$), the second width ($D_{x2}$) and the third width ($D_{x3}$) are identical.

16. The metasurface as recited in claim 12, wherein the first width ($D_{x1}$), the second width ($D_{x2}$) and the third width ($D_{x3}$) are different.

17. The metasurface as recited in claim 12, wherein the first principal in-plane direction ($\theta_1$), the second principal in-plane direction ($\theta_2$) and third principal in-plane direction ($\theta_3$) are identical.

18. The metasurface as recited in claim 12, wherein the first principal in-plane direction ($\theta_1$), the second principal in-plane direction ($\theta_2$) and third principal in-plane direction ($\theta_3$) are different.

19. The metasurface as recited in claim 12, wherein the multiple asymmetric nanofeatures are arrayed across the structured dielectric layer, and the first length ($D_{y1}$), the second length ($D_{y2}$), the third length ($D_{y3}$), the first width ($D_{x1}$), the second width ($D_{x2}$), the third width ($D_{y3}$), the first principal in-plane direction ($\theta_1$), the second principal in-plane direction ($\theta_2$), the third principal in-lane direction ($\theta_3$) are identical in at least two asymmetric nanofeatures in the multiple asymmetric nanofeatures.

20. The metasurface as recited in claim 12, wherein the multiple asymmetric nanofeatures are arrayed across the structured dielectric layer, and the first length ($D_{y1}$), second length ($D_{y2}$), the third length ($D_{y3}$), the first width ($D_{x1}$), the second width ($D_{x2}$), the third width ($D_{y3}$), first principal direction ($\theta_1$), second principal direction ($\theta_2$), third principal direction ($\theta_3$) are different in each asymmetric nanofeature.

21. The metasurface as recited in claim 12, wherein the multiple asymmetric nanofeatures are posts with an elliptical shape or a rectangular shape.

22. The metasurface as recited in claim 12, wherein the multiple asymmetric nanofeatures are voids with an elliptical shape or a rectangular shape.

23. The metasurface as recited in claim 12, wherein the structured dielectric layer comprises, silicon, silicon dioxide, zinc selenide, zinc sulfide, silicon nitride, germanium, or titanium dioxide.

24. An imaging system comprising a metasurface as recited in claim 1 and at least two detector arrays.

25. A metasurface comprising:
a substrate layer that is optically transparent throughout a spectral range, the spectral range defined by a smallest wavelength $\lambda_{min}$ and a largest wavelength $\lambda_{max}$)
a structured dielectric layer comprising an optically transparent material that is optically transparent over the spectral range, the structured dielectric layer consisting of multiple asymmetric nanofeatures, each having a height (H) between $\lambda_{min}/100$ and $2\lambda_{max}$;
wherein the multiple asymmetric nanofeatures comprise at least thirty nanofeatures with a length ($D_y$) along a first principal in-plane direction ($\theta_1$) and a width ($D_x$) along a second in-plane direction orthogonal to the first principal in-plane direction, wherein the length ($D_y$) and the width ($D_x$) are between $\lambda_{min}/100$ and $\lambda_{min}$ in size,
wherein each length ($D_y$) of each nanofeature in the at least thirty nanofeatures is offset along an x-y plane of the substrate layer by a different angle $\theta$ such that each nanofeature has a different principal in-plane direction ($\theta$).

* * * * *